(12) United States Patent
Takahashi

(10) Patent No.: US 7,849,577 B2
(45) Date of Patent: Dec. 14, 2010

(54) METHOD FOR MANUFACTURING PLYWOOD HAVING OMNIDIRECTIONAL STRENGTH

(76) Inventor: Nobuo Takahashi, 70-1 Aza-Terayashikimae, Miyagi Prefecture, Shiroishi-Shi (JP)

( * ) Notice: Subject to any disclaimer, the term of this patent is extended or adjusted under 35 U.S.C. 154(b) by 318 days.

(21) Appl. No.: 12/142,938

(22) Filed: Jun. 20, 2008

(65) Prior Publication Data

US 2009/0053452 A1  Feb. 26, 2009

(51) Int. Cl.
*B32B 37/02* (2006.01)
(52) U.S. Cl. .................. 29/428; 144/355; 144/363; 156/258; 156/304.1
(58) Field of Classification Search .............. 428/55, 428/58, 106; 144/355, 363, 367; 156/256, 156/258, 300, 304.1, 304.3; 29/428
See application file for complete search history.

(56) References Cited

U.S. PATENT DOCUMENTS

| 3,686,061 A | 8/1972 | Brown et al. |
| 3,970,497 A | 7/1976 | Glover et al. |
| 4,802,946 A | 2/1989 | Mason |
| 5,486,393 A | 1/1996 | Wiklund et al. |
| 2008/0121334 A1* | 5/2008 | Ohata .................. 156/71 |

* cited by examiner

*Primary Examiner*—Alexander Thomas
(74) *Attorney, Agent, or Firm*—Gifford, Krass, Sprinkle, Anderson & Citkowski, P.C.

(57) ABSTRACT

Omnidirectional strength plywood includes at least one ply disposed so that its grain runs diagonal to the length and width of the plywood sheet, and as such its grain diagonally intersects the grain of at least one other ply of the sheet. In some instances, two diagonal plies are disposed so that their grains intersect at approximate right angles and both run diagonal to the length and the width of the sheet. Further disclosed is a method for the manufacture of the diagonal grain plies.

4 Claims, 5 Drawing Sheets

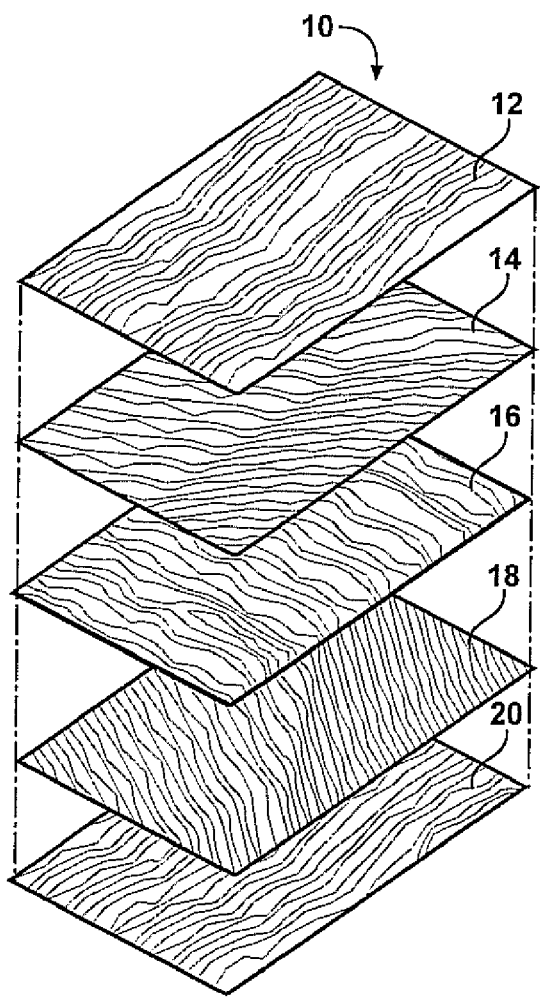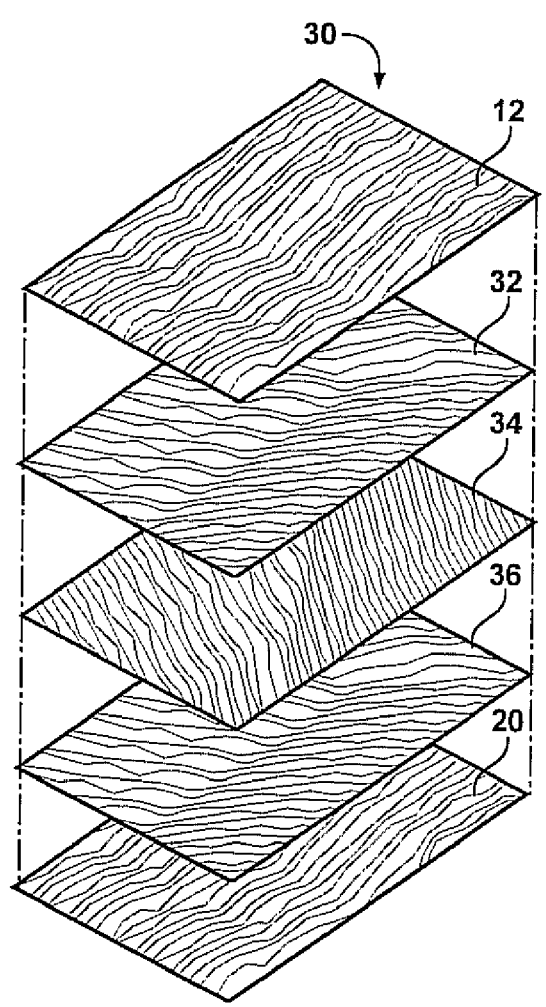
FIG - 1   FIG - 2

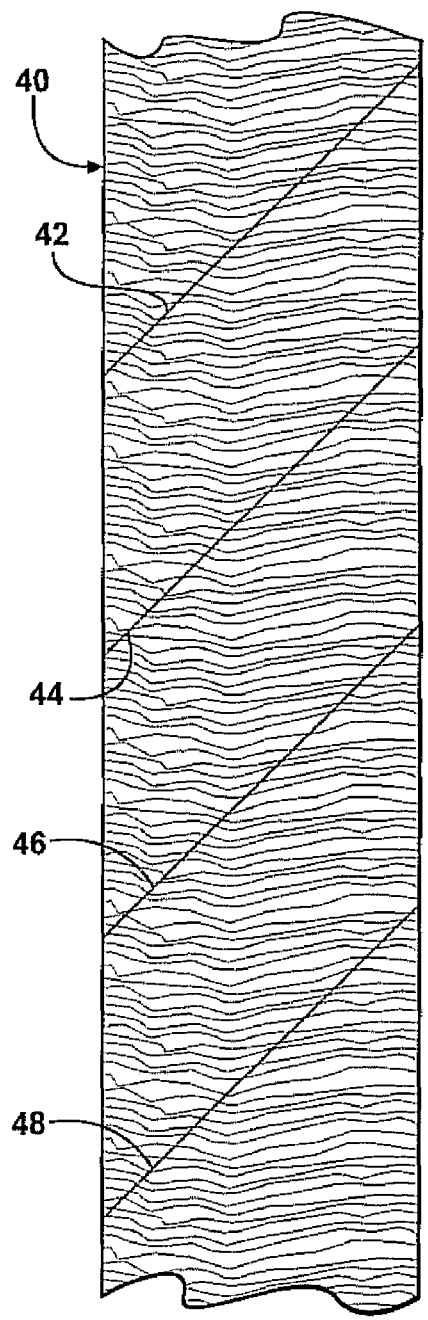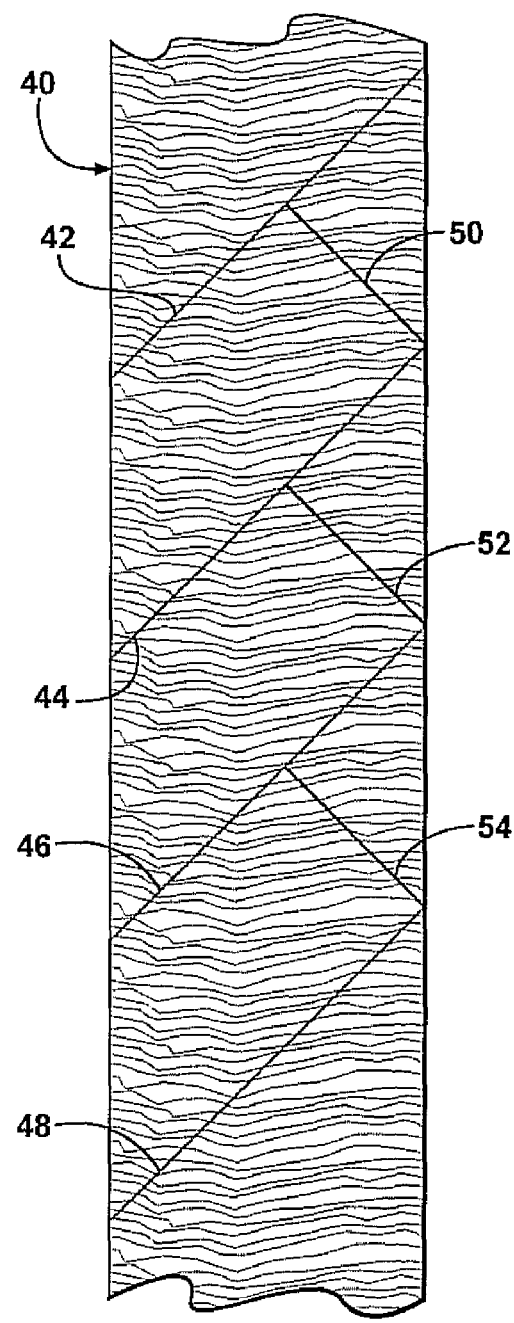
FIG - 3  FIG - 4

METHOD FOR MANUFACTURING PLYWOOD HAVING OMNIDIRECTIONAL STRENGTH

CROSS REFERENCE TO RELATED APPLICATIONS

This application claims priority of Japanese Utility Model Registration 3136619 filed Aug. 21, 2007.

FIELD OF THE INVENTION

This invention relates generally to plywood and more specifically to plywood which incorporates one or more diagonal grain plies in its construction and has omnidirectional strength. The invention further relates to methods for making diagonal grain plies for use in such constructions.

BACKGROUND OF THE INVENTION

Plywood sheets are fabricated by laminating a plurality of relatively thin sheets of wood, referred to as plies, in a stacked relationship. The plies may be made from hardwoods or softwoods; and a single plywood sheet may be made entirely from hardwood or softwood; or, it may be made from a combination of the two. Plywood has a good strength-to-weight ratio, is relatively low in cost, durable, and prepared from renewable resources. Hence, plywood is widely used in a variety of constructions. In a typical plywood sheet, the plies are stacked so that the grain of the wood of some of the plies runs in a length (vertical) direction and the grain of the wood in other of the plies runs in a width (horizontal) direction. This right angle relationship of the wood grains provides a sheet having high strength in both the length and width (X and Y) directions. However, plywood of such construction has a somewhat lower strength as measured in a direction diagonal to the length and width dimensions.

As will be explained in greater detail hereinbelow, the present invention is directed to plywood sheets which incorporate one or more plies having the grain of the constituent wood running diagonal to the length and width dimensions. This allows for the fabrication of plywood having high strength not only in its length and width dimensions but also in a direction diagonal to its length and width. This type of plywood is referred to as having "omnidirectional" strength. As disclosed herein, the present invention further provides for the low cost fabrication of such omnidirectional strength plywood by providing methods for efficiently fabricating plies having a diagonal grain direction. As a result, the present invention provides for the fabrication of low cost plywood sheets having high, omnidirectional strength. Such plywood sheets have a high strength-to-weight ratio. Such sheets have a number of applications, and have particular utility in the fabrication of earthquake and storm resistant building structures. These and other advantages of the invention will be apparent from the drawings, discussion and description which follow.

BRIEF DESCRIPTION OF THE INVENTION

Disclosed is a plywood sheet having omnidirectional strength. The sheet includes a longitudinal grain ply comprising a rectangular body of wood having a length dimension and a width dimension wherein the grain of the body of the wood is parallel to the length dimension of said ply. The sheet further has a transverse grain ply comprising a rectangular body of wood having a length dimension and a width dimension wherein the grain of the body of wood is parallel to the width dimension of said ply. The sheet also includes a diagonal grain ply comprising a rectangular body of wood having a length dimension and a width dimension wherein the grain of the body of wood is diagonal to the length and width dimensions of the ply. In the sheet, the plies are laminated together in a superposed relationship so that the grain of the body of wood of the longitudinal ply is at right angles to the grain of the body of wood of the transverse grain ply and the grain of the body of wood of the diagonal grain ply is diagonal to the grain of the body of wood of the vertical grain ply and the grain of the body of wood of the transverse grain ply. In particular embodiments, still further plies may be laminated into the construction.

Also disclosed is a method for making diagonal grain plies for use in such plywood constructions. According to the method, a web of wood having a length and width is cut, diagonal to its width, so as to sever the web into a plurality of nonrectangular parallelograms. Each of the nonrectangular parallelograms is then cut into two segments, with the first segment defining a right triangle and a second defining a trapezoid which includes two right angles, one obtuse angle and one acute angle. The right triangular segment is then disposed in an abutting relationship with the trapezoidal segment so that the hypotenuse of the right triangular segment abuts the side of the trapezoid extending between the acute angle and the obtuse angle and thereby defines a rectangular ply. In specific instances, the grain of the body of wood constituting the elongated web is disposed so as to run in a direction corresponding to the width of the web. In specific instances, the nonrectangular parallelogram is cut into two segments so that the acute angle of the resultant trapezoid is 45 degrees and the obtuse angle of the trapezoid is 135 degrees, and the right triangle is an isosceles right triangle.

In a particular instance, the parallelogram is cut into two segments so that the trapezoidal segment includes a first side having a length equal to X, a second side which is joined to the first side at a right angle and has a length of X, a third side which is joined to the second side at a right angle and has a length of 2X, and a fourth side extending between the third side and the first side wherein the fourth side has a length of $\sqrt{2X^2}$; and wherein the second segment is a right isosceles triangle having two sides each having a length of X and a hypotenuse having a length of $\sqrt{2X^2}$.

Further disclosed are methods for preparing plywood sheets which incorporate diagonal grain plies, which in particular instances are plies prepared according to the foregoing methods.

BRIEF DESCRIPTION OF THE DRAWINGS

FIG. 1 is an exploded view of a plywood sheet structured in accord with the present invention;

FIG. 2 is an exploded view of another plywood sheet structured in accord with the present invention;

FIGS. 3-7 show a sequence of steps used for the fabrication of a diagonal grain ply;

DETAILED DESCRIPTION OF THE INVENTION

Figure 5:
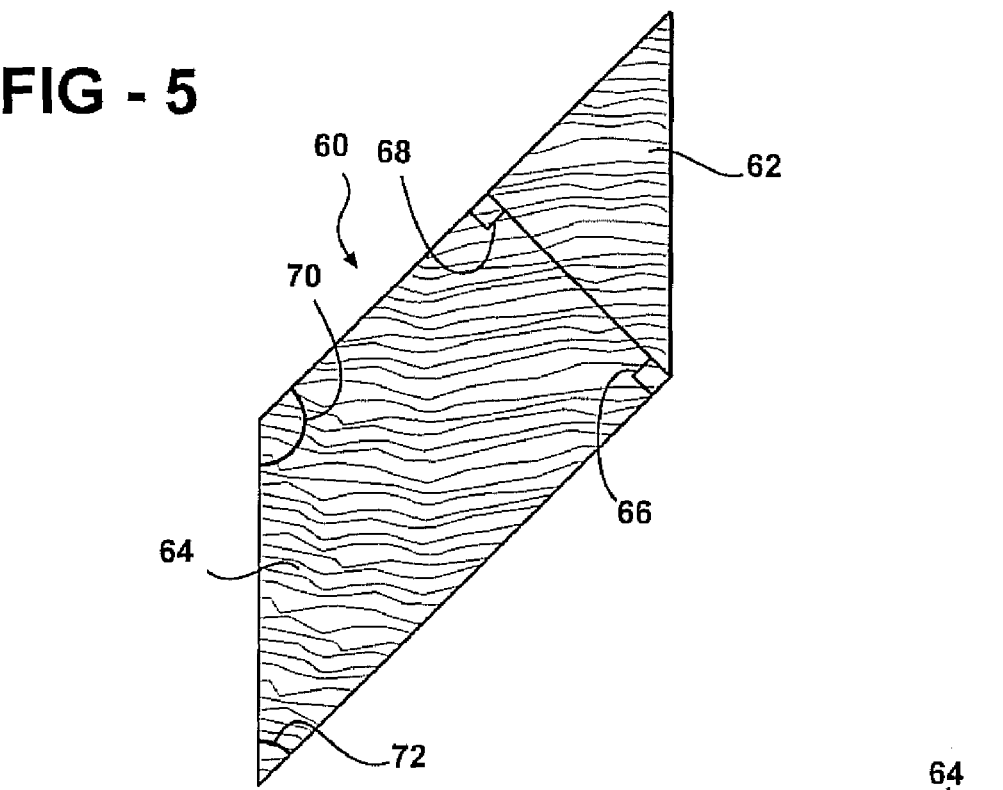

The present invention is directed to plywood having omnidirectional strength and to components, materials and methods for its fabrication. As is known in the art, a sheet of plywood is constructed from a plurality of individual plies, each comprising a relatively thin sheet of wooden stock material. The individual plies are laminated together utilizing adhesive materials in combination with pressure and, in some instances, heat. There are a number of techniques for cutting and laminating the plies, and all of such techniques may be utilized in the practice of the present invention. It should be noted that for purposes of this discussion, the plies are described as having a wood grain running in a specified direction, for example a length, width, or diagonal direction. It is to be understood that wood grain, being a natural product, has some variation in its direction. Hence, the entirety of the grain in a given body of wood is not always in a precisely parallel direction; therefore, it is to be understood that all specified grain directions are with regard to the average or collective direction of the grain.

Referring now to FIG. 1, there is shown an exploded view of a plywood sheet 10 structured in accord with the principles of the present invention. As illustrated, the sheet 10 is comprised of five individual plies 12, 14, 16, 18 and 20 which are disposed in a stacked relationship. As is known in the art, these sheets will be laminated together to form the final plywood product. In the drawing of FIG. 1, plies 12 and 20 are disposed so that the grain of the ply runs lengthwise to the plywood construction and as such, these are termed longitudinal grain plies, it being understood that in the context of this disclosure terms such as longitudinal, transverse, vertical, horizontal, and the like are all relative and are meant to express the interrelationship of the various components.

As is further shown in FIG. 1, the plywood sheet 10 includes a core portion which in this instance is comprised of plies 14, 16 and 18. Ply 16 is a transverse grain ply, and in that regard its grain runs in the direction of the width of the plywood sheet, and is at approximate right angles to the grain of the longitudinal grain plies 12 and 20.

The plywood sheet 10 further includes a first diagonal grain ply 14 which is disposed so that its grain runs at a diagonal to the grain of the transverse ply sheet 16 and the grain of the longitudinal grain plies 12 and 20. The construction includes a second diagonal grain ply 18 which is disposed so that its grain is at approximate right angles to the grain of the first diagonal grain sheet 14 and at a diagonal to the grain of the transverse grain ply 16 and to the grain of the longitudinal grain plies 12 and 20.

In other embodiments of the invention, a larger or smaller number of plies may be included in the structure provided that it incorporates at least one diagonal grain ply. Also, while the structure is illustrated as having longitudinal grain plies on its front and back face, such is not required by the invention, and the plies may be disposed in any order.

Referring now to FIG. 2, there is shown another embodiment of a plywood sheet 30 structured in accord with the principles of the present invention. The plywood sheet 30 of FIG. 2 includes longitudinal grain plies 12 and 20 on its front and back faces. In this instance, the core portion is comprised solely of diagonal grain plies and in this instance comprises plies 32, 34 and 36.

Ply 32 is a first diagonal grain ply and it is disposed so that its grain is at a diagonal to the grain of the two longitudinal grain plies 12 and 20. A second diagonal grain ply 34 is disposed so that its grain is at right angles to the grain of the first diagonal grain ply 32 and diagonal to the grain of the longitudinal grain plies 12 and 20. A third diagonal grain ply 36 is disposed so that its grain is at approximate right angles to the grain of the second diagonal grain ply 34, generally parallel to the grain of the first diagonal grain ply 32, and at approximate right angles to the grain of the longitudinal grain plies 12 and 20.

While the foregoing drawings have shown plywood in which the thicknesses of each of the plies are approximately equal, it is to be understood that the invention may be implemented in yet other embodiments wherein the thickness of the various plies differs. Also, ply types, numbers, configurations and orientations may be other than those shown herein provided that the plywood structure includes at least one diagonal grain ply.

In a typical process for the fabrication of plywood, stock material for the preparation of plies is prepared by cutting a series of very long, thin wooden sheets from a log which is rotated in a cutting lathe. The thus-produced material comprises a relatively long web of wooden material having its grain running transverse to the length of the web; that is to say, the grain runs in the direction of the width of the web. As will be appreciated, this web could be easily cut into individual plies having a grain orientation either longitudinal or transverse to the length of the subsequently cut plies.

It will further be appreciated that given the nature of the web, production of diagonal grain plies may be complicated by the factor that a typical cutting process will produce a significant amount of waste. The present invention addresses the problem of producing diagonal grain plies by providing a cutting method whereby waste is eliminated.

Referring now to FIG. 3, there is shown a web of wood 40, of the type used in the production of plywood. As illustrated, the grain of the wood runs transverse to the length of the web 40. In a first step of the process, the web 40 is cut into a series of nonrectangular parallelograms by making a series of diagonal cuts extending across the width of the web 40. In this regard, FIG. 3 shows four cuts 42, 44, 46 and 48 extending across the width of the web.

In a second step, each of the nonrectangular parallelograms is then cut into two segments. In that regard FIG. 4 illustrates cuts 50, 52 and 54 as having been made.

Referring now to FIG. 5, there is shown one of the nonrectangular parallelograms 60 resultant from the cutting as previously described. The nonrectangular parallelogram 60 has been cut into two portions 62 and 64 so that a first segment 62 defines a right triangle, and the second segment 64 defines a trapezoid which includes two right angles 66 and 68, one obtuse angle 70 and one acute angle 72.

Figure 6:
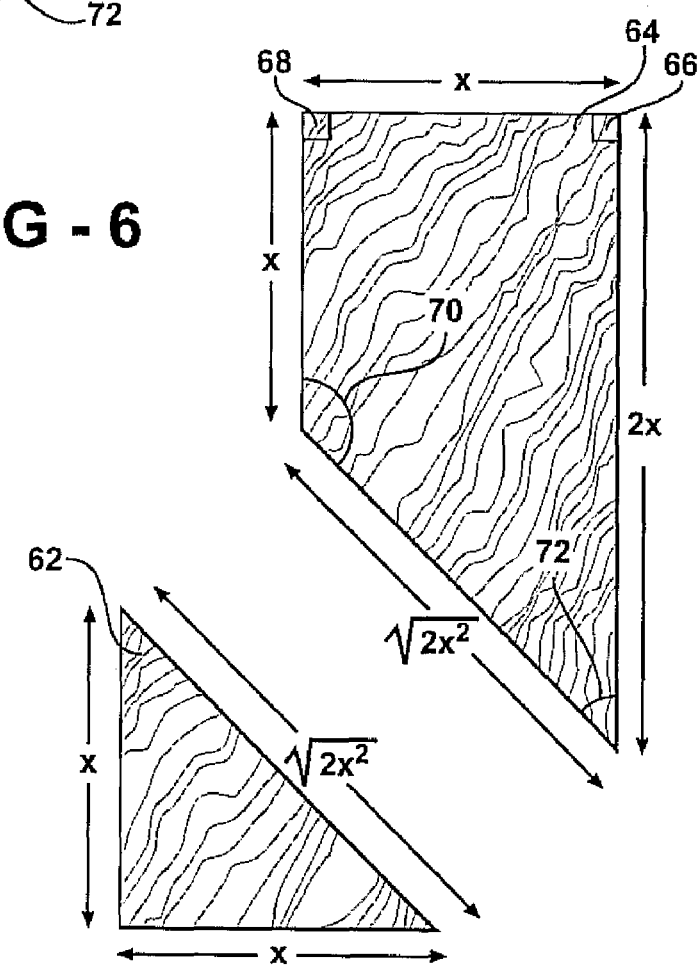
Figure 7:
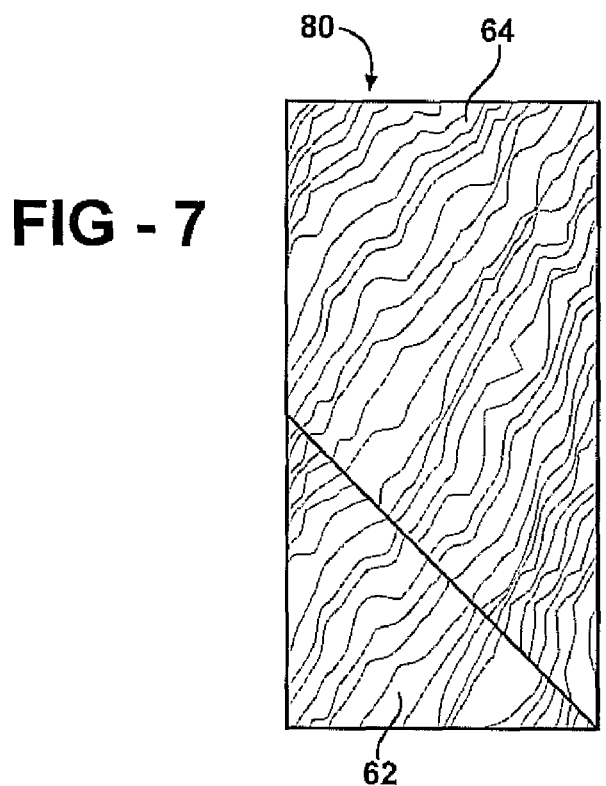

In further steps as illustrated in FIGS. 6 and 7, the thus cut nonrectangular parallelogram is reassembled into a rectangular, diagonal grain ply. As illustrated, the right triangular segment 62 is disposed in an abutting relationship with the trapezoidal segment 64 so that the hypotenuse of the right triangular segment 62 abuts the side of the trapezoid extending between the acute angle 72 and the obtuse angle 70. As shown in FIG. 7, this produces a rectangular ply 80 having a diagonal grain. In assembling the ply, the triangular segment 62 and trapezoidal segment 64 may be adhered together by glue, tape or the like for further handling during the assembly of the plywood structure. Alternatively, the two may be assembled into an abutting relationship when the plies are being stacked for lamination.

In the production of plywood, the elongated web described herein is very often fabricated so that the width of the web will correspond to the length of the finished plywood sheet, and in that regard, longitudinal grain plies may be obtained by cutting across the width of the sheet parallel to the wood grain at intervals corresponding to the width of the plywood sheet. Likewise, transverse grain plies may be prepared by first cutting the web across its width at intervals corresponding to the length of the finished plywood sheet and then dividing these pieces into two portions by cutting at right angles to the grain.

In such instance, rectangular, diagonal grain plies may be readily prepared from the same web so as to have appropriate dimensions for direct incorporation into the plywood sheet. In this regard, referring back to FIG. 4, it will be seen that if the diagonal cuts 42, 44, 46 and 48 are made so as to have a length equal to the length of the finished plywood sheet, and the second series of cuts 50, 52 and 54 are made so as to be at right angles to the first cut and so as to have a length equal to the width of the finished plywood sheet, the resultant right triangular segment 62 and trapezoidal segment 64 will assemble into a diagonal grain ply 80, as shown in FIG. 7, having the appropriate dimensions.

Specifically, and referring to FIG. 6, the acute angle 72 of the trapezoidal segment 64 is a 45 degree angle and the obtuse angle 70 is a 135 degree angle. The triangular segment 62 is an isosceles right triangular segment dimensioned so that each of its two sides has a length of X, and as a result, the hypotenuse will have a length of $\sqrt{2X^2}$.

The trapezoidal segment 64 is configured so that the two sides joined by the right angle 68 each have a length of X and the long side joining the right angle 66 has a length of 2X. The fourth side of the trapezoid extending between the acute angle 72 and the obtuse angle 70 has a length of $\sqrt{2X^2}$.

An experimental series was carried out evaluating the strength properties of the omnidirectional plywood of the present invention as compared to conventional plywood. In that regard, 9 millimeter thick omnidirectional strength plywood of the present invention (referred to as ODS plywood in the accompanying graphs) was compared to conventional 9 millimeter thick plywood (referred to as common plywood in the accompanying graphs). The two plywood samples were essentially similar except for the inclusion of diagonal ply grains as shown in FIG. 1.

Figure 8:
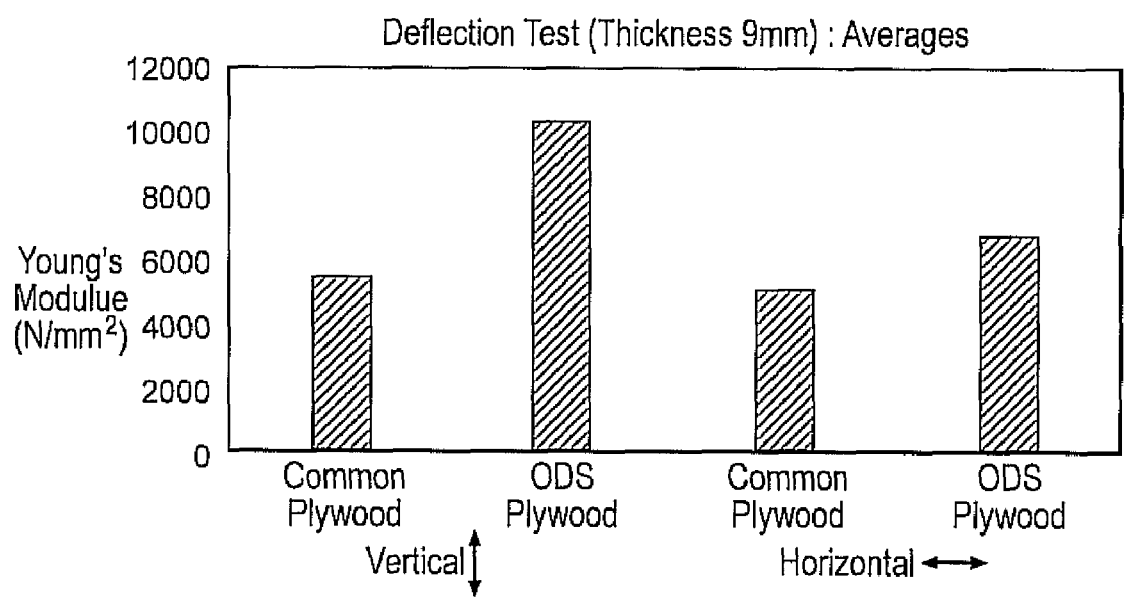
FIG. 8 is a graph comparing the deflection of standard plywood and omnidirectional plywood in both the vertical and horizontal directions.

In a first series of tests, deflection of the two plywood samples was measured in a vertical and a horizontal direction in accord with standard testing procedures wherein the sheets were clamped in a fixture and subjected to various loadings. FIG. 8 is a graph of results from the measurement of six different samples for each type of plywood showing the Young's modulus for each. As will be seen, the ODS plywood is much stiffer than common plywood in both a vertical and horizontal direction.

Figure 9:
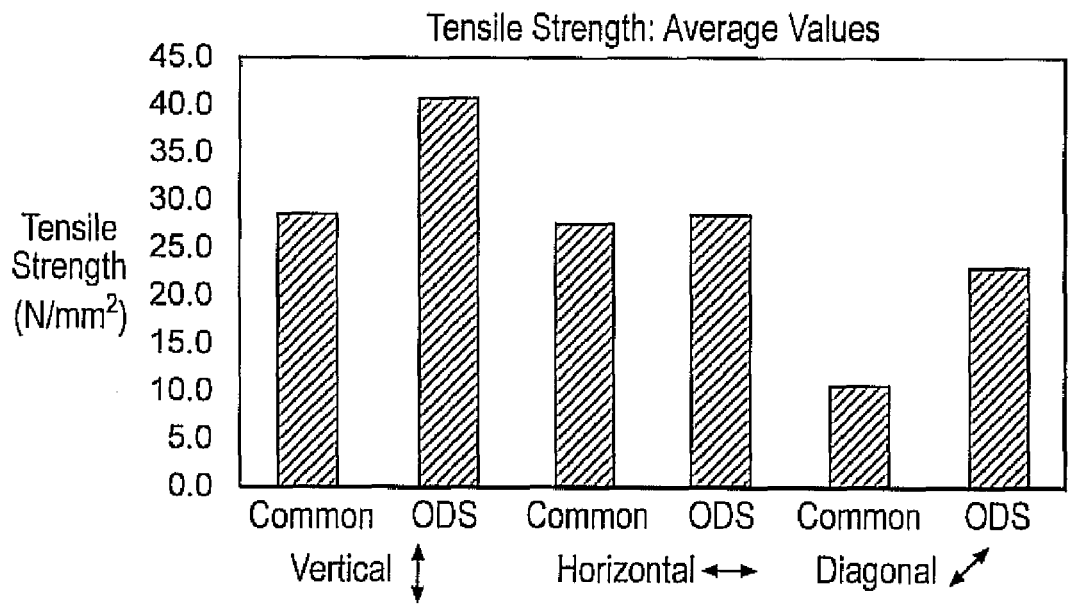
FIG. 9 is a graph comparing the tensile strength of common plywood and omnidirectional strength plywood in vertical, horizontal and diagonal directions.

In a second experimental series, the tensile strength of the plywood samples was measured by conventional techniques wherein a load was applied to the sheets in a vertical, horizontal and diagonal direction. The data of FIG. 9 summarizes measurements made on six different samples, and it will be seen that the tensile strength of the omnidirectional strength plywood exceeds that of the common plywood, particularly with regard to strength in the diagonal direction.

Figure 10:
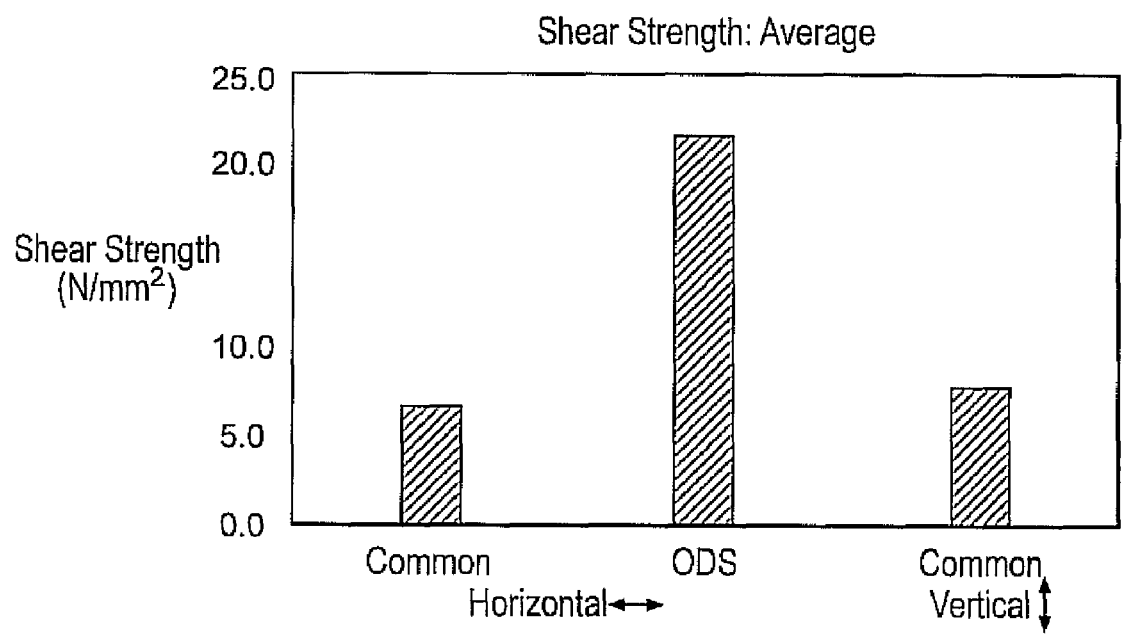
FIG. 10 is a graph showing the shear strength of common plywood and omnidirectional strength plywood in a horizontal direction, and the shear strength of common plywood in a vertical direction, with the comparable shear strength of omnidirectional strength plywood in the vertical direction being omitted since it was off scale.

In another evaluation, the shear strength of the samples was measured in both a horizontal and a vertical direction and this was carried out in accord with standard practice by affixing a test apparatus to front and rear surfaces of the sheet and subsequently pulling them apart along an axial direction. The FIG. 10 graph summarizes the results for the shear strength evaluation for the common plywood and the ODS plywood in a horizontal direction and it will be seen that the shear strength of the ODS plywood greatly exceeds that of the common plywood. The FIG. 10 graph also shows the vertical shear strength for common plywood, and this strength is generally similar to the strength in the horizontal direction. However, the shear strength for the ODS plywood in the vertical direction exceeded the measuring capability of the instrumentation employed in this evaluation, and cannot be included in this figure.

In summary, it will be seen that in all directions tested, the omnidirectional strength plywood exhibited increased strength as compared to conventional plywood. Similar evaluations were carried out with regard to 12 millimeter thick plywood and similar improvements in strength were found. It should be noted that the data developed for the ODS plywood was based upon samples produced in a small-scale, laboratory facility. These ODS samples demonstrated superior results as compared to commercial plywood samples produced on large-scale, conventional production lines, and it is anticipated that ODS samples produced on large-scale commercial lines will provide still better results. Table 1 hereinbelow summarizes the results of these tests.

TABLE 1

| Test | Thickness (mm) | Grain | Type of Plywood | Strength (N/mm$^2$) | Relative Strength vs. Common Plywood |
|---|---|---|---|---|---|
| Deflection | 9 | 0° | Common | 5475 | 1.88 x |
| | | | ODS | 10282 | |
| | | 90° | Common | 5081 | 1.33 x |
| | | | ODS | 6778 | |
| | 12 | 0° | Common | 5093 | 1.57 x |
| | | | ODS | 8014 | |
| | | 90° | Common | 5585 | 1.25 x |
| | | | ODS | 6963 | |
| Tensile | 9 | 0° | Common | 28.4 | 1.43 x |
| | | | ODS | 40.5 | |
| | | 90° | Common | 27.3 | 1.03 x |
| | | | ODS | 28.2 | |
| | | 45° | Common | 10.6 | 2.14 x |
| | | | ODS | 22.6 | |
| Shear | 9 | 0° | Common | 6.5 | 3.24 x |
| | | | ODS | 21.2 | |

The plywood of the present invention has a very high strength-to-weight ratio. As such, this plywood will have significant utility in the construction of earthquake proof and storm proof structures as well as in aeronautical applications, marine applications, and other instances where light weight and high strength are required. In addition, the methods of the present invention allow for the low cost, material-efficient fabrication of the diagonal grain plies and thereby decrease the cost of the omnidirectional strength plywood.

The foregoing drawings, discussion and description disclose some particular embodiments of the present invention. However, in view of the teaching presented herein numerous other modifications and variations will be apparent to those of skill in the art. For example, while the present invention has described flat sheet plywood, it will be appreciated that the principles hereof may be used in combination with processes and materials which involve molded or otherwise shaped plywood structures. Furthermore, use of various adhesives, laminating techniques, manufacturing techniques and the like will be readily apparent to one of skill in the art and may be implemented in connection with the present invention. It is the following claims, including all equivalents, which define the scope of the invention.

The invention claimed is:

1. A method for preparing a diagonal grain ply for use in the fabrication of a sheet of plywood, said method comprising:
   providing an elongated web of wood having a length and a width;
   making a series of parallel cuts across, and diagonal to, the width of the web so as to sever the web into a plurality of nonrectangular parallelograms;
   cutting each nonrectangular parallelogram into two segments, the first segment defining a right triangle and the second segment defining a trapezoid which includes two right angles, one obtuse angle and one acute angle; and
   disposing one of said right triangular segments in an abutting relationship with one of said trapezoidal segments so that the hypotenuse of said right triangular segment abuts the side of said trapezoid extending between said acute angle and said obtuse angle, so as to define a rectangular ply.

2. The method of claim 1, wherein the grain of the wood of said elongated web runs in a direction corresponding to the width of said web.

3. The method of claim 1, wherein the step of cutting each nonrectangular parallelogram into two segments is carried out so that the acute angle of said trapezoid is 45 degrees, the obtuse angle of said trapezoid is 135 degrees, and the right triangle is an isosceles right triangle.

4. The method of claim 1, wherein said step of cutting each nonrectangular parallelogram into two segments is carried out so that the trapezoidal segment includes a first side having a length equal to X, a second side which is joined to said first side at a right angle and has a length of X, a third side which is joined to said second side at a right angle and has a length of 2X, and a fourth side extending between said third side and said first side, said fourth side having a length of $\sqrt{2X^2}$; and wherein the second segment is a right triangle having two sides, each having a length of X, and a hypotenuse having a length of $\sqrt{2X^2}$.

* * * * *